United States Patent
Tacklind

(10) Patent No.: US 7,604,208 B2
(45) Date of Patent: Oct. 20, 2009

(54) HEIGHT ADJUSTABLE, PLATFORM LEVELING MULTI-POD

(75) Inventor: Christopher A. Tacklind, Palo Alto, CA (US)

(73) Assignee: Robert Bosch Company Limited, Hong Kong (CN)

( * ) Notice: Subject to any disclaimer, the term of this patent is extended or adjusted under 35 U.S.C. 154(b) by 474 days.

(21) Appl. No.: 10/877,627

(22) Filed: Jun. 25, 2004

(65) Prior Publication Data

US 2005/0017139 A1 Jan. 27, 2005

Related U.S. Application Data

(60) Provisional application No. 60/482,676, filed on Jun. 26, 2003, provisional application No. 60/517,963, filed on Nov. 5, 2003.

(51) Int. Cl.
*F16M 11/02* (2006.01)
*F16M 11/38* (2006.01)

(52) U.S. Cl. ............ 248/180.1; 248/177.1; 248/187.1; 248/170; 248/188.9

(58) Field of Classification Search ............... 248/166, 248/176.1, 177.1, 179.1, 180.1, 186.1, 187.1, 248/170, 171, 188.8, 188.9
See application file for complete search history.

(56) References Cited

U.S. PATENT DOCUMENTS

| | | | | |
|---|---|---|---|---|
| 821,335 A * | 5/1906 | Butler | | 248/168 |
| 1,746,364 A * | 2/1930 | Schuler | | 89/40.06 |
| 1,962,547 A * | 6/1934 | Zerk | | 248/188.8 |
| 2,161,718 A * | 6/1939 | Miller | | 248/182.1 |
| 2,245,901 A * | 6/1941 | Chaskin | | 33/295 |
| 2,563,389 A * | 8/1951 | Blum | | 248/180.1 |
| 2,668,682 A * | 2/1954 | Dalton | | 248/169 |
| 2,775,423 A * | 12/1956 | Strass | | 248/180.1 |
| 3,051,425 A * | 8/1962 | Homrighausen | | 248/168 |
| 3,229,376 A * | 1/1966 | Wilcox | | 33/324 |
| 3,404,859 A * | 10/1968 | Chapman | | 248/184.1 |
| 3,963,207 A * | 6/1976 | Guasti | | 248/168 |
| 4,199,123 A * | 4/1980 | Weber et al. | | 248/168 |
| 4,244,547 A * | 1/1981 | Kooi | | 248/180.1 |
| 4,266,748 A * | 5/1981 | Dalton | | 248/425 |
| 4,570,886 A * | 2/1986 | Mooney | | 248/186.1 |
| 4,767,090 A * | 8/1988 | Hartman et al. | | 248/168 |
| 4,832,296 A * | 5/1989 | Schnepp | | 248/168 |
| 4,940,203 A * | 7/1990 | Hayakawa | | 248/188.9 |
| 5,614,918 A * | 3/1997 | Dinardo et al. | | 343/882 |
| 5,644,850 A * | 7/1997 | Costales | | 33/282 |
| 5,749,549 A * | 5/1998 | Ashjaee | | 248/168 |
| 6,272,785 B1 * | 8/2001 | Mika et al. | | 42/94 |

(Continued)

*Primary Examiner*—Anita M King
(74) *Attorney, Agent, or Firm*—Vierra Magen Marcus & DeNiro LLP

(57) ABSTRACT

An apparatus including a platform having a surface secured to at least one leg, and leveling apparatus secured to the platform providing an indication of level about at least two axes. A method of positioning the apparatus includes the steps of positioning an end point of a first leg on a fiduciary point; setting a height of a mounting platform by extending said first leg; positioning an end point of a second leg to engage a surface; leveling the mounting platform on a first axis; positioning an end point of a third leg to engage said surface; leveling the mounting platform on a second axis; and re-positioning said first leg so that said end point is in a desired position.

10 Claims, 18 Drawing Sheets

U.S. PATENT DOCUMENTS 6,631,877 B1 * 10/2003 Crain et al. .................. 248/168
6,702,482 B2 * 3/2004 Sherwin ..................... 396/428
6,942,187 B2 * 9/2005 Blackburn ............... 248/163.1

* cited by examiner

HEIGHT ADJUSTABLE, PLATFORM LEVELING MULTI-POD

This application claims the benefit of U.S. Provisional Application No. 60/482,676, entitled, "Height Adjustable, Platform Leveling Multi-pod," filed on Jun. 26, 2003, and U.S. Provisional Application No. 60/517,963, entitled, "Height Adjustable, Platform Leveling Multi-Pod," filed on Nov. 5, 2003, incorporated herein by reference.

BACKGROUND OF THE INVENTION

Tripods are commonly used for any number of applications where a user requires an instrument to be secured to a platform which is stable at a given height. Typically tripods have legs attached to a platform where the legs may be rotated outwardly in radial direction away from each other (and a central axis normal to the mounting platform), and may be extended or retracted to adjust their length. This allows the tripod to be adjusted for stability and height relative to the surface upon which its rests. In addition, the tripod may include a fourth member extending upwardly from the platform upon which the instrument is mounted in order further provide for height adjustment. In certain applications such as surveying, it is particularly important that a tripod be centered about a fiduciary or known reference point. It may also be particularly important for the instrument to be mounted on the platform on a level platform surface.

Currently, in order to provide a level platform surface and ensure that the tripod is mounted directly over a fiduciary point, a user will need to use a plumb-bob hung from the mounting point on the platform and extending toward the fiduciary point. A person attempting to position the tripod on the fiduciary point will generally position the tripod and extend the legs in a trial and error attempt to both position the platform at the correct location on the fiduciary point and, using one more levels positioned along two or three different axes, ensure that the platform itself is level. This process of trial and error is repeated until a satisfactory position of the tripod is achieved. Given that any movement of the tripod legs will change the height and level of the platform, this process requires a significant amount of time and is very inefficient.

Hence, a tripod which provides level platform with a defined height about a centered on a fiduciary point which can be positioned in an efficient manner would be extremely useful.

SUMMARY OF THE INVENTION

The invention, roughly described, comprises an apparatus including a platform having a surface secured to at least one leg, and leveling apparatus secured to the platform providing an indication of level about at least two axes. In one embodiment, the invention is a tripod. The tripod includes a mounting platform including a leveling apparatus, and a first leg, a second leg and a third leg, said first leg including a base point intersecting a mounting area of said platform.

In a further embodiment, the invention is a method of positioning a multi-pod apparatus. The method includes the steps of extending a first of one or more additional legs of said multi-pod; leveling the mounting platform on a first axis; extending a second of one or more additional legs of said multi-pod; and leveling the mounting platform on a second axis.

In a further embodiment, the invention is a method of positioning a tripod. The method includes the steps of positioning an end point of a first leg on a fiduciary point; setting a height of a mounting platform by extending said first leg; positioning an end point of a second leg to engage a surface; leveling the mounting platform on a first axis; positioning an end point of a third leg to engage said surface; leveling the mounting platform on a second axis; and repositioning said first leg so that said end point is in a desired position.

In yet another embodiment, the invention is a tripod. The tripod includes a mounting platform including a three axis leveling apparatus. The mounting apparatus is coupled to three legs. A first leg includes a first end rotatably coupled to the mounting platform and a second end having a centering base point provided thereon. A second leg and a third leg, each have a first end rotatably coupled to the mounting platform and a second end with a base point.

DETAILED DESCRIPTION

An apparatus and method providing a level, stable, height certain mounting platform on a mono- or multi-pod base is hereinafter described. In the embodiment described herein, the invention is described as a tripod. However, it should be understood that the apparatus of the invention may further comprise a multi-pod or a monopod. A multi-pod includes any devices having more than two legs, while the term monopod refers to a single leg stand.

Figure 1:
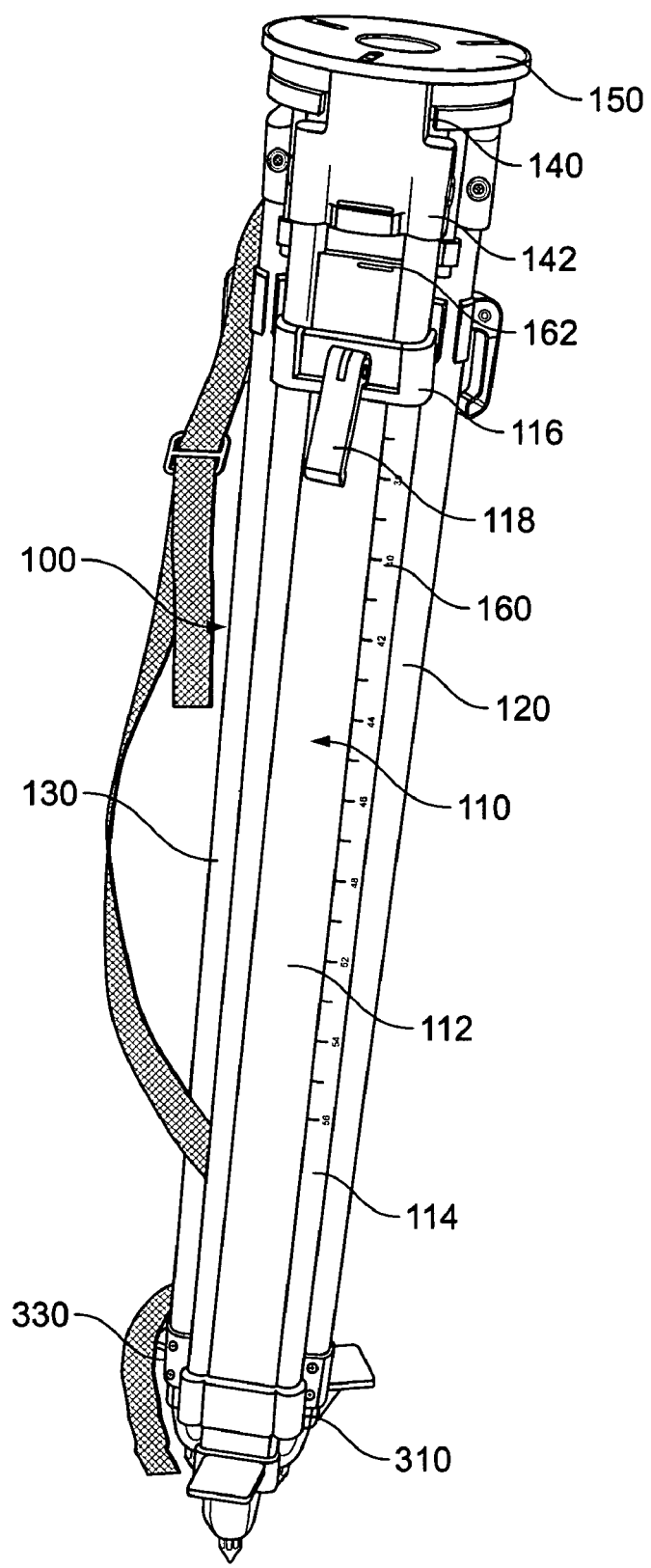
FIG. 1 is a perspective view of a multi-pod in accordance with the present invention.
Figure 14:
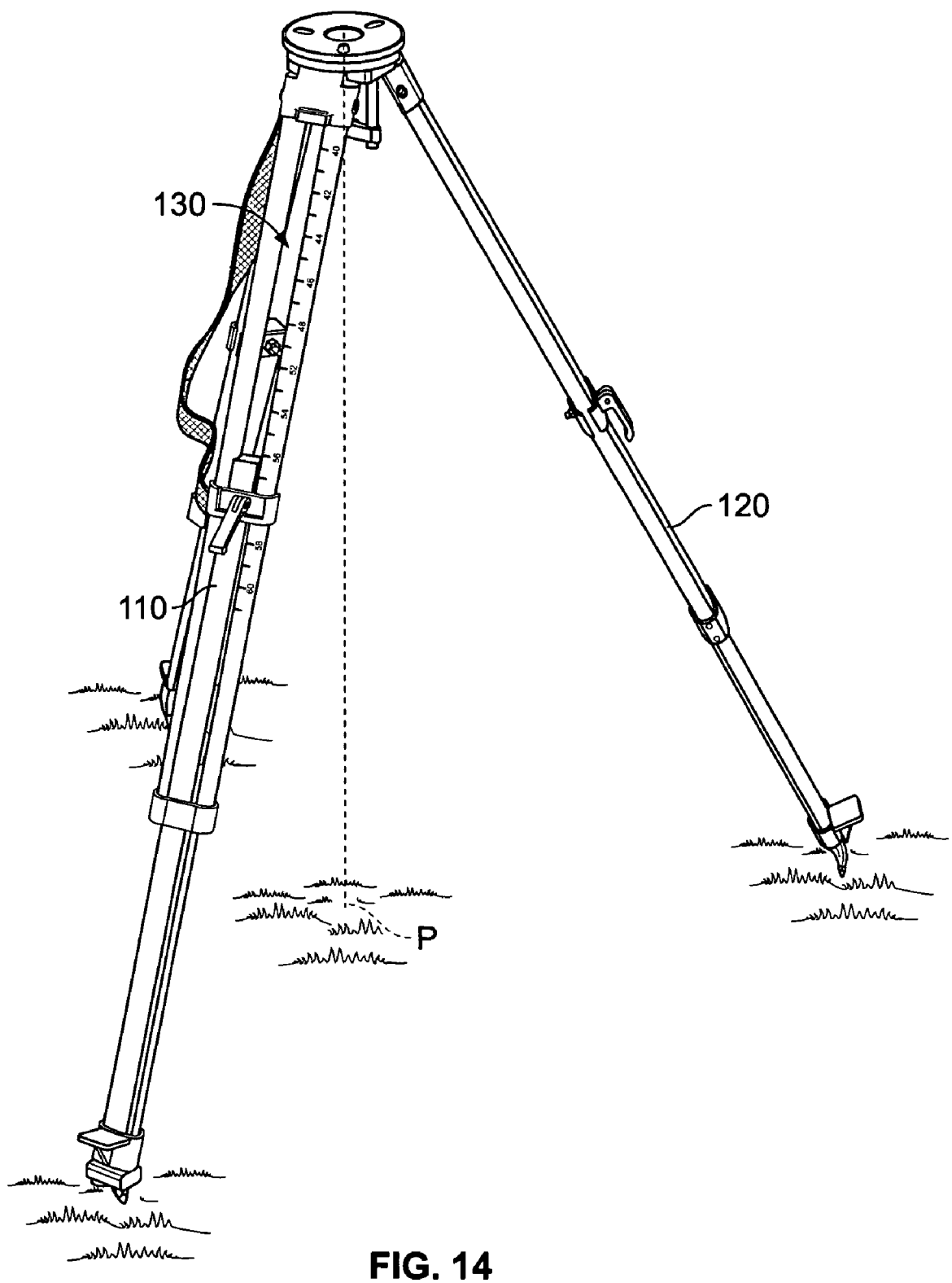

FIG. 1 is a perspective view of a tripod 100 in accordance with the present invention. In FIG. 1, the legs of the tripod 100 are in the closed position. (A perspective view of the tripod in an "open" position is shown in FIG. 14.) The tripod includes a number of features which allow the mounting platform 150 of the tripod 100 to be centered upon a fiduciary point, provide a level platform 150 mounting surface 152 and be efficiently set at a certain, known height. It should be understood that construction of the tripod shown in FIG. 1 is exemplary and the unique features of the tripod of the present invention will be described herein.

Tripod 100 includes three legs 110, 120, 130, which are alternatively referred to herein as leg "0,3" (or leg 110), leg "2" (or leg 120), and leg "1" (or leg 130). The numbers "0,3", "1" and "2" are labels affixed to the legs which make it easier for a user to perform the method described in FIG. 5 for positioning the tripod 100 in sequence e.g. by moving legs in sequence 0, 1, 2, 3. Such labels are arbitrary and need not be used, or could be comprised of any sequential indicator such as letters "A, B, C, D". Each leg 110, 120, 130 is similar in construction (unless otherwise noted) and hence only the construction of leg 110 will be described with reference to FIG. 1. Leg 110 includes an outer member 114 and an inner member 112 which is mounted in outer member 114 to allow the member 112 to slide relative to member 114, and thereby extend the length of leg 110. While two outer members 114 are provided surrounding inner member 112, it will be understood that the particular construction of the legs is not critical to the invention and any number of alternative, extendable leg constructions may be used. For example, the legs may be made in a tubular manner, wherein one or more inner legs extend from outer legs to vary the height of the platform. A bracket 116 and clamp 118 secure inner member 112 to outer member 114. Upon releasing the clamp 118, the inner member is allowed to slide along the length of the outer member and extend the length of the leg until secured by clamp 118.

Leg 110 includes a linear measurement scale 160 along the length of one of outer members 114. These marks denote the actual height of the platform 150 when aligned with a demarcation line 162 on inner member 112. This demarcation line 162 is aligned with any of the markings on member 114 so that a user can determine the height of tripod 100. While the linear measurement scale 160 is shown on only one leg in FIG. 1, in an alternative embodiment, the scale may be provided on any of legs 110, 120, 130. Each of legs 110, 120, 130, also includes an foot assembly 310, 320, 330, respectively. The foot assemblies will be further described with reference to FIGS. 3, 15 and 16. Outer member 114 is coupled to a bracket 142 which rotates about a hinge 140 securing bracket 142 and leg 110 to platform 150. This allows leg 110 to rotate radially outward from an axis perpendicular to a center point of the platform 150 (shown as point "c" in FIGS. 2a, 2b) about the hinge 140 in a manner well known in the art. In some tripods, a rotation stop will prevent rotation of each leg beyond a certain angle. In one embodiment of the present invention, leg 110, 120, or 130 can rotate from a vertical position shown in FIG. 1 approximately 90 degrees (completely perpendicular to the central axis) about hinge 140. In an alternative embodiment, a rotation stop for each leg is provided thereby limiting rotation of each leg to an equal amount less than 90 degrees relative to the central axis.

Figure 2A:
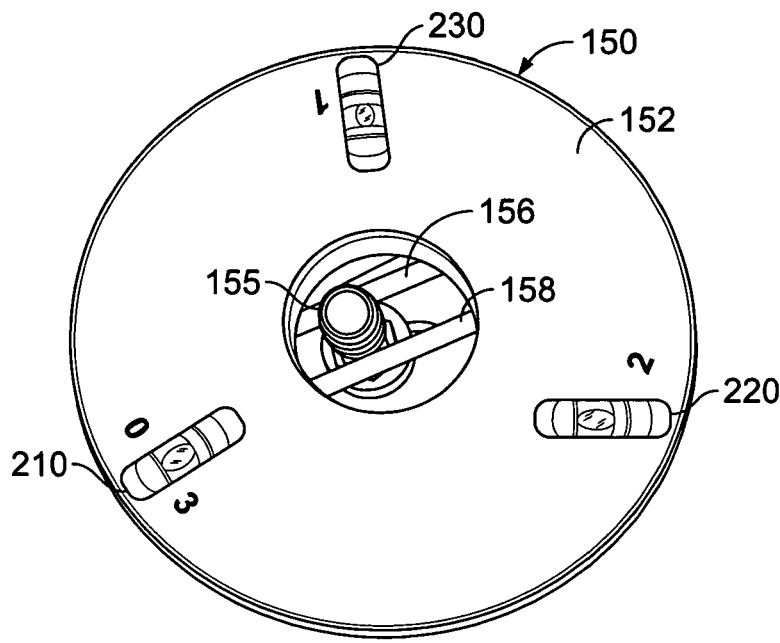
FIG. 2A is a perspective view.
Figure 2B:
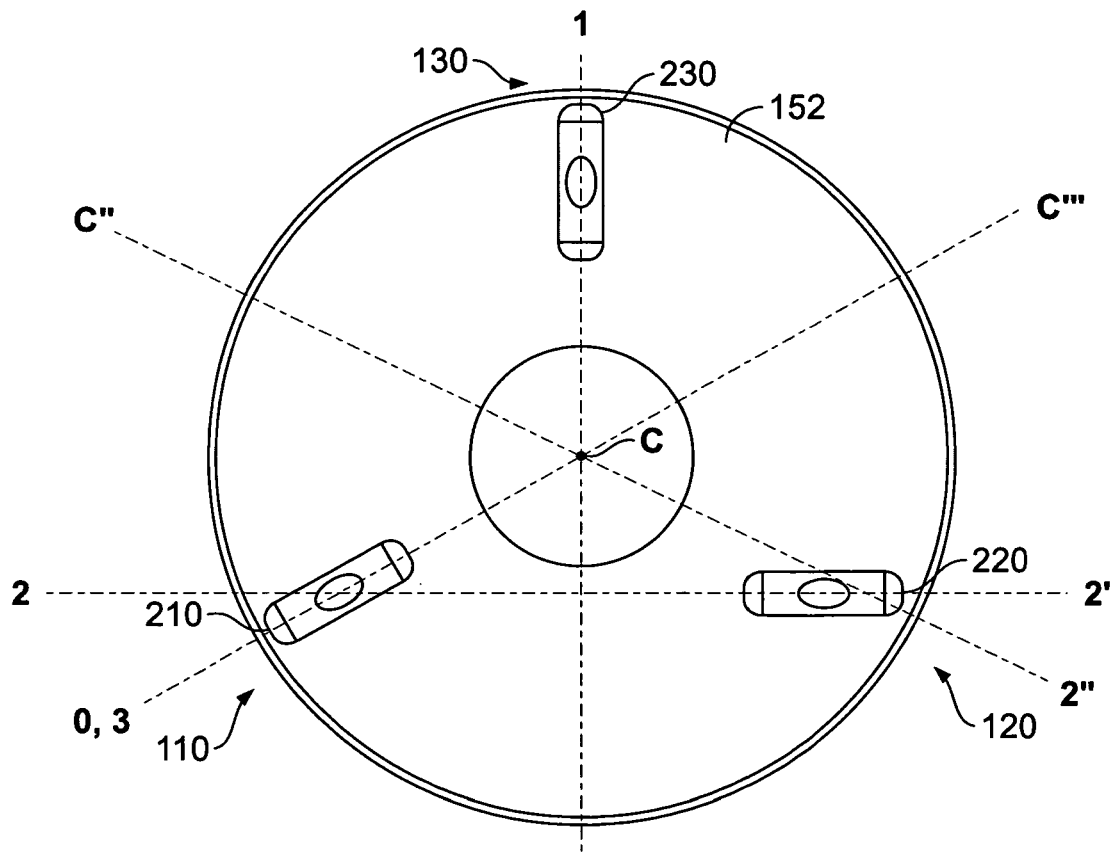
FIG. 2B a plan view of a mounting platform used in accordance with the multipod shown in FIG. 1.

FIGS. 2A and 2B are perspective and plan of views, respectively, of the platform 150 of the tripod 100. As shown in FIG. 2A and 2B, platform 150 includes three bubble vials 210, 220, and 230 which are respectively associated with an aligned to legs 110(0,3) 120(2) and 130(1). Platform 150 also includes a securing bolt 155 which is fixed in rails 156, 158 and which is used to mount instruments to surface 152 of platform 150. As shown in FIG. 2A, labels are provided adjacent to each of the bubble vials and, as will be described below, the labels 0,3; 1; and 2 provide the ordering of steps which a user might use to position the tripod in accordance with the method of the present invention. It should be recognized that while bubble vials are utilized as means of indicating a level state of the platform, alternative means of indicating level, such as a laser level, may be utilized in accordance with the present invention.

As described below with respect to FIG. 3, each leg 110, 120, 130 includes a base point which contacts the surface upon which the tripod is mounted. With reference to FIG. 2B, rotation of the legs about each hinge 140 means that a base point mounted on the base assemblies 310, 320, 330 of each leg 110, 120, 130, respectively, moves along a line between the point and a center-point "C" located in the center of the platform 150. Point "C" is shown in FIG. 2B. For example, leg 110 forms an axis 0,3-C''' between its base point and center-point "C". Likewise, leg 130 forms an axis 1-C' and leg 120 forms an axis 2''-C'', as depicted in FIG. 2B. Bubble vials 210 and 230 are aligned on the respective axes 0,3-C''' and 1-C' of legs 110 ("0,3") and 130("1"). Bubble vial 220 is aligned on an axis 2-2' which is perpendicular to axis 1-C' for reasons which will be described with respect to the method of the present invention. However, it should be recognized that bubble vial 220 may also be aligned symmetrically along axis 2'-C''' in an alternative environment of the present invention.

Figure 3:
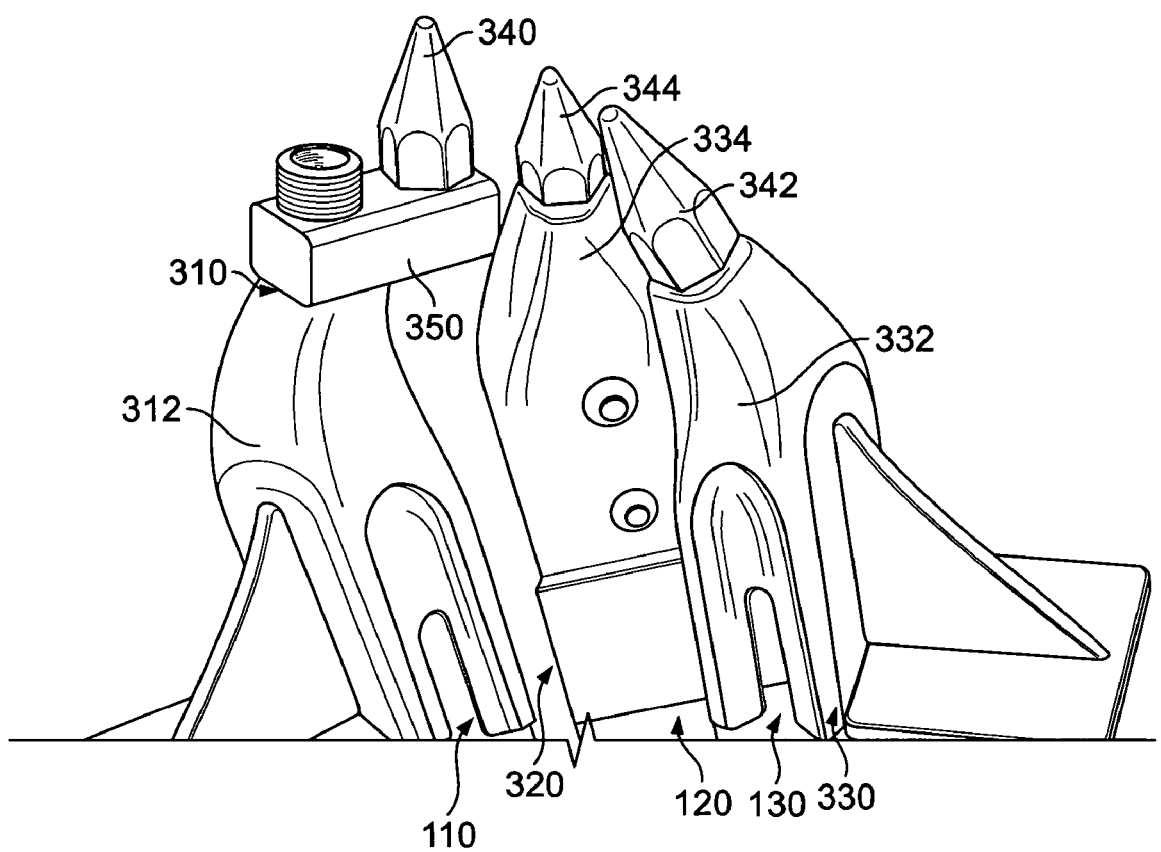
FIG. 3 is a perspective view of the base points and leg bases used in accordance with the multipod shown in FIG. 1.
Figure 15:
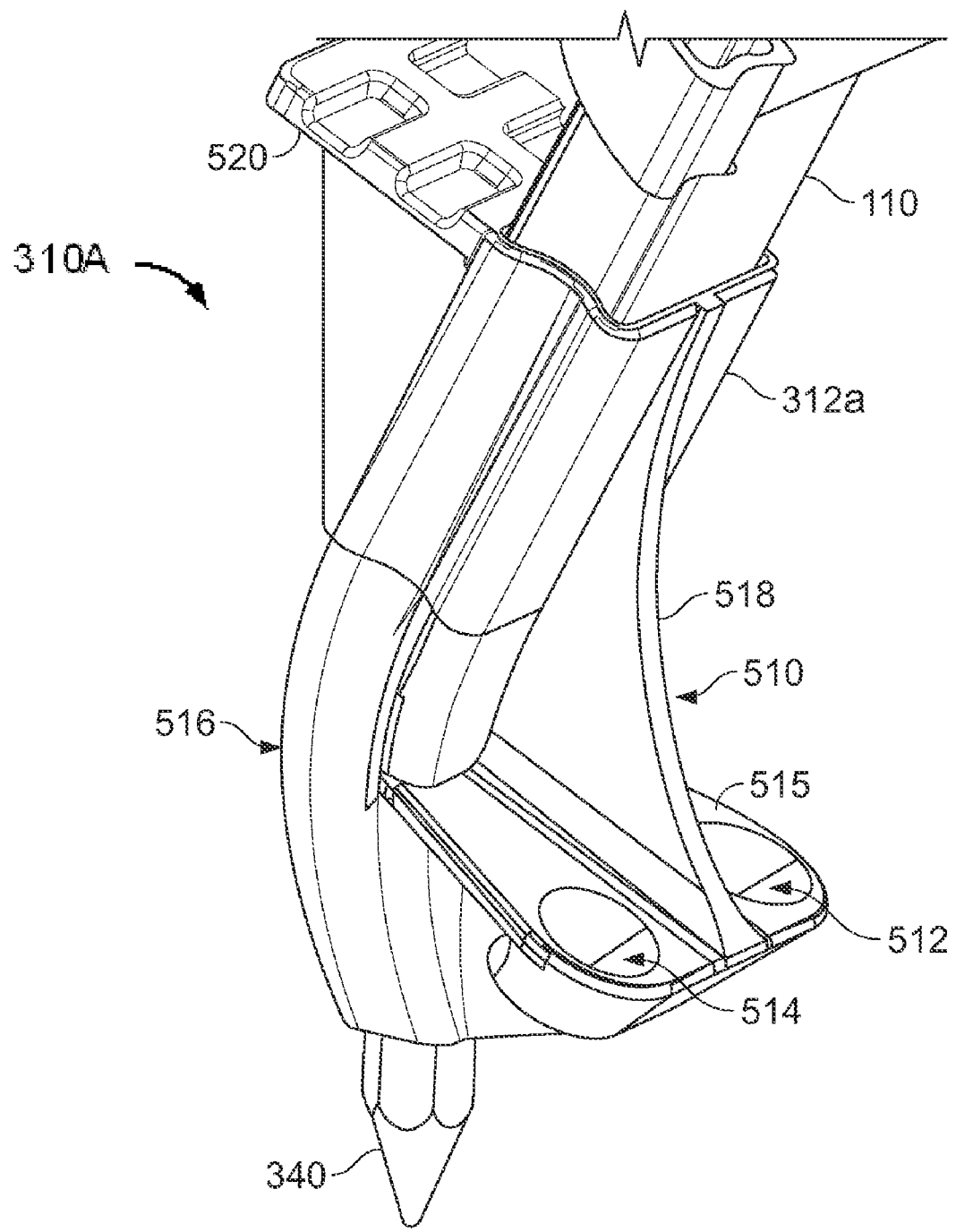
FIG. 15 is a perspective view of an alternative foot assembly in accordance with the present invention.
Figure 16:
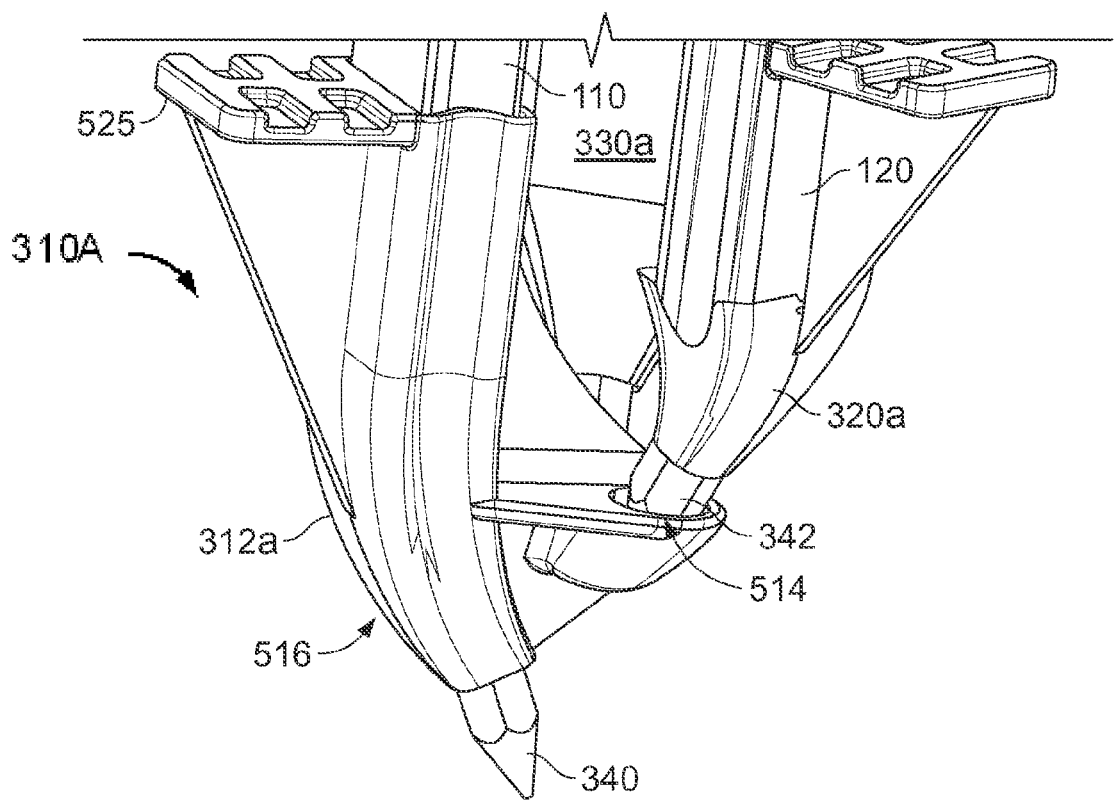
FIG. 16 is an alternative perspective view of the foot assembly shown in FIG. 15.

FIG. 3 shows one embodiment of the foot assemblies 310, 320, 330 of the tripod the present invention. Two foot assemblies 320, 330, are identical in construction, while assembly 310 is somewhat different. Assemblies 320 and 330 include a foot housing 332, 334 respectively mounted on legs 130 and 120. Each housing is provided with a base point 342, 344, for legs 130, 120, respectively, which allow precise positioning of the tripod 100 on a support surface. Additional embodiments of the foot assemblies are shown in FIGS. 15 and 16.

Foot assembly 310 includes a foot housing 312, a centering block 350 and a base point 340. Centering block 350 is a fixed length beam positioned along axis 0,3-C''' so that when leg 110 is positioned exactly perpendicular to the plane formed by the surface 152 of platform 150, base point 340 is aligned at the center axis, directly below center point "C" in platform 150. A vertical alignment bracket 400 shown in FIG. 4 ensures this positioning. Block 350 may be secured to base assembly 312 by a nut and bolt assembly.

In an alternative embodiment, each of the foot assemblies 310, 320, and 330 may include a centering block 350 upon which the base points are mounted.

Figure 4:
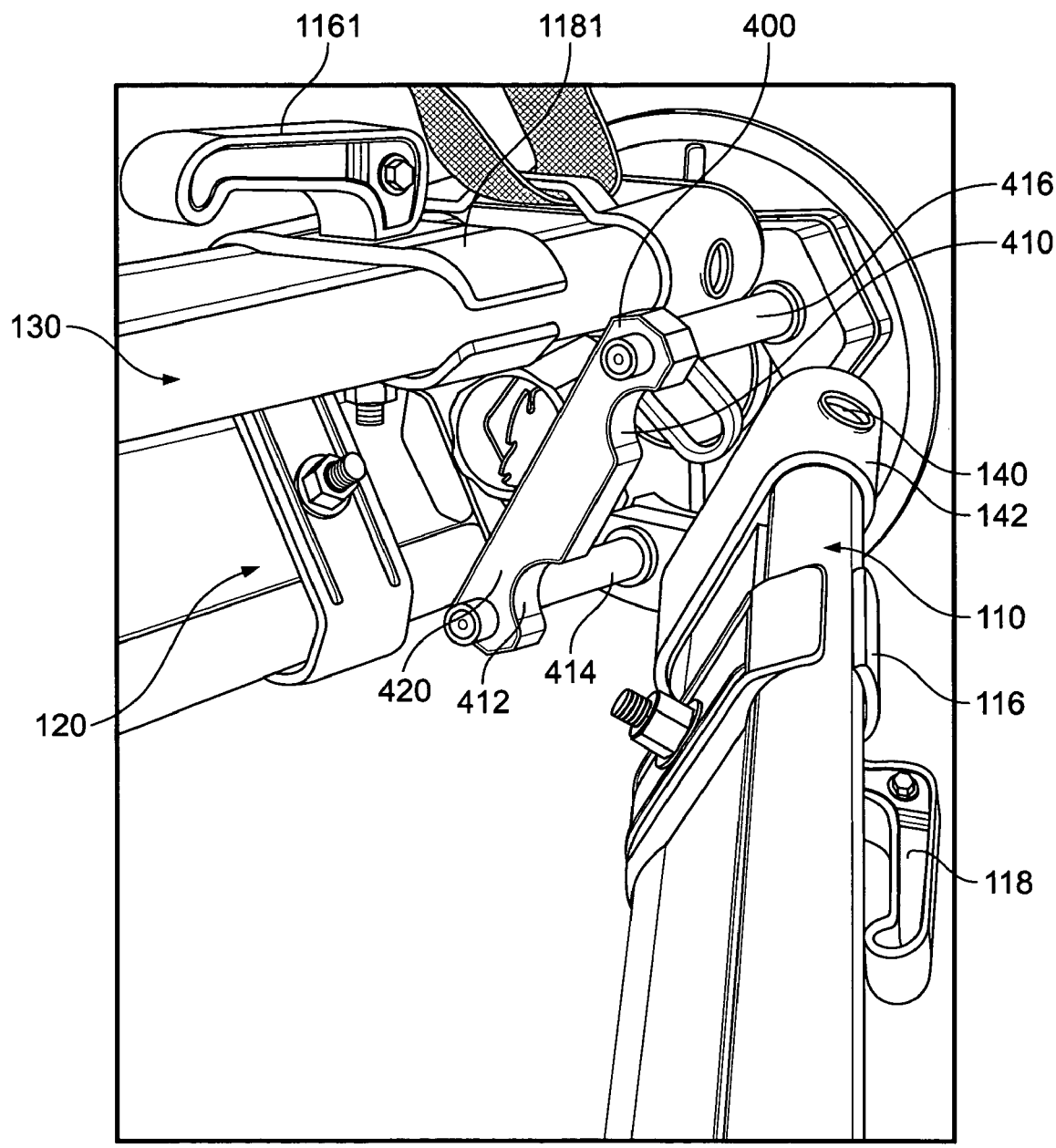
FIG. 4 is a partial perspective view of a positioning bracket mounted to the lower portion of the platform of the multipod shown in FIG. 1.

FIG. 4 shows a perspective view of the underside of the platform 150 of tripod 100. Shown therein are legs 110, 120, and 130, and a vertical alignment bracket 400 which is secured to the base of platform 150. Bracket 400 includes two posts 414, 416 upon which a horizontal strut 420 is mounted. Horizontal strut 420 includes semi-circular indentations 410 and 412 sized to receive the tubular outer member 114 of leg 110. When leg 110 is an engagement with bracket 400, the position of base point 340 mounted to the end of leg 110 is known to be exactly at center point "C" of platform 150. Alternative forms of the housing bracket 400 may be utilized in accordance with the present invention.

Figure 5:
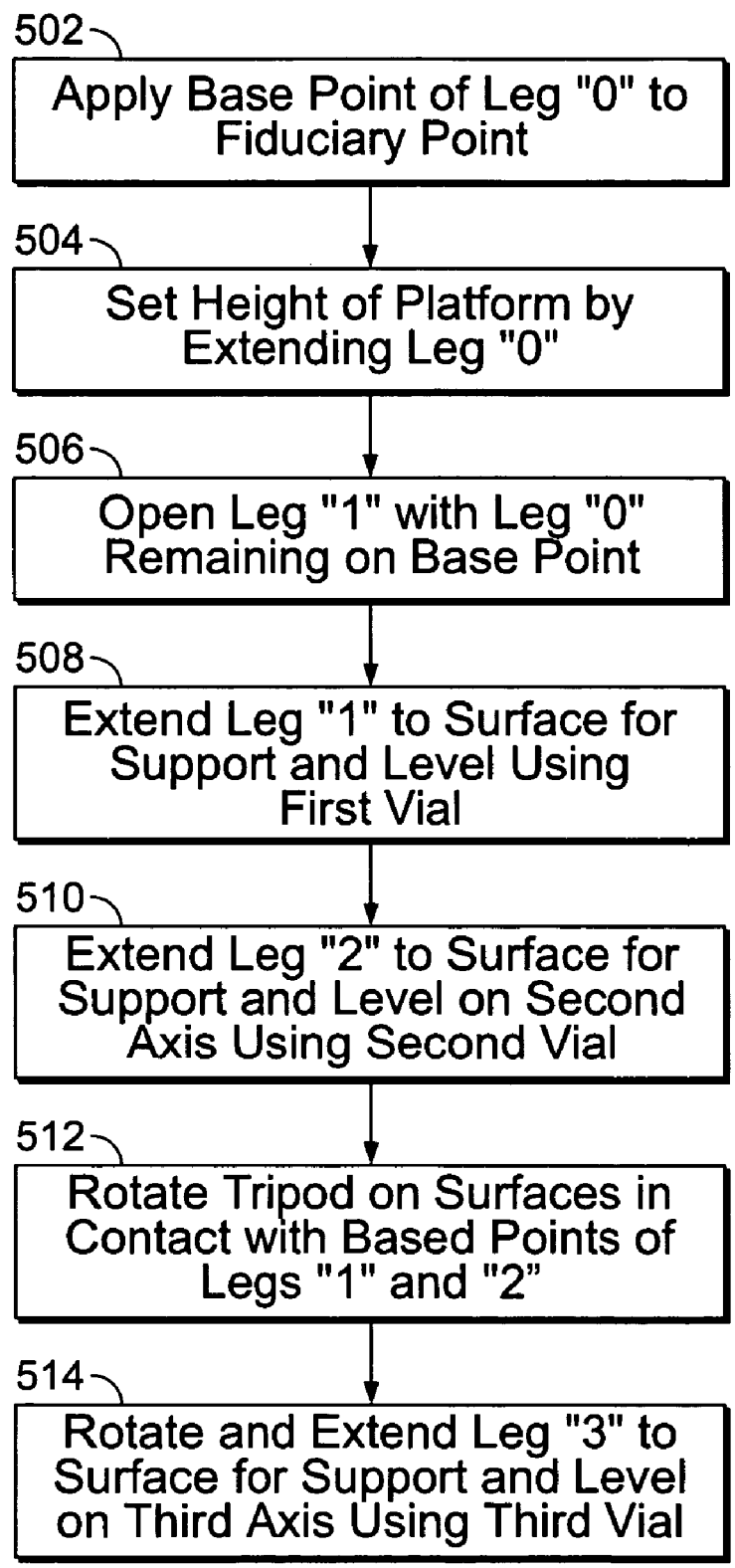
FIG. 5 is a flowchart illustrating a method for using the multipod of the present invention.

FIG. 5 is a flowchart depicting a method in accordance with the present invention for utilizing tripod 100. The steps in FIG. 5 are further illustrated in FIGS. 6 through 14.

Assume that a user wishes to position a tripod exactly so that center point "C" is over a fiduciary point, at a certain height, and has a completely level mounting platform 150 in order to perform a certain a task.

Figure 6:
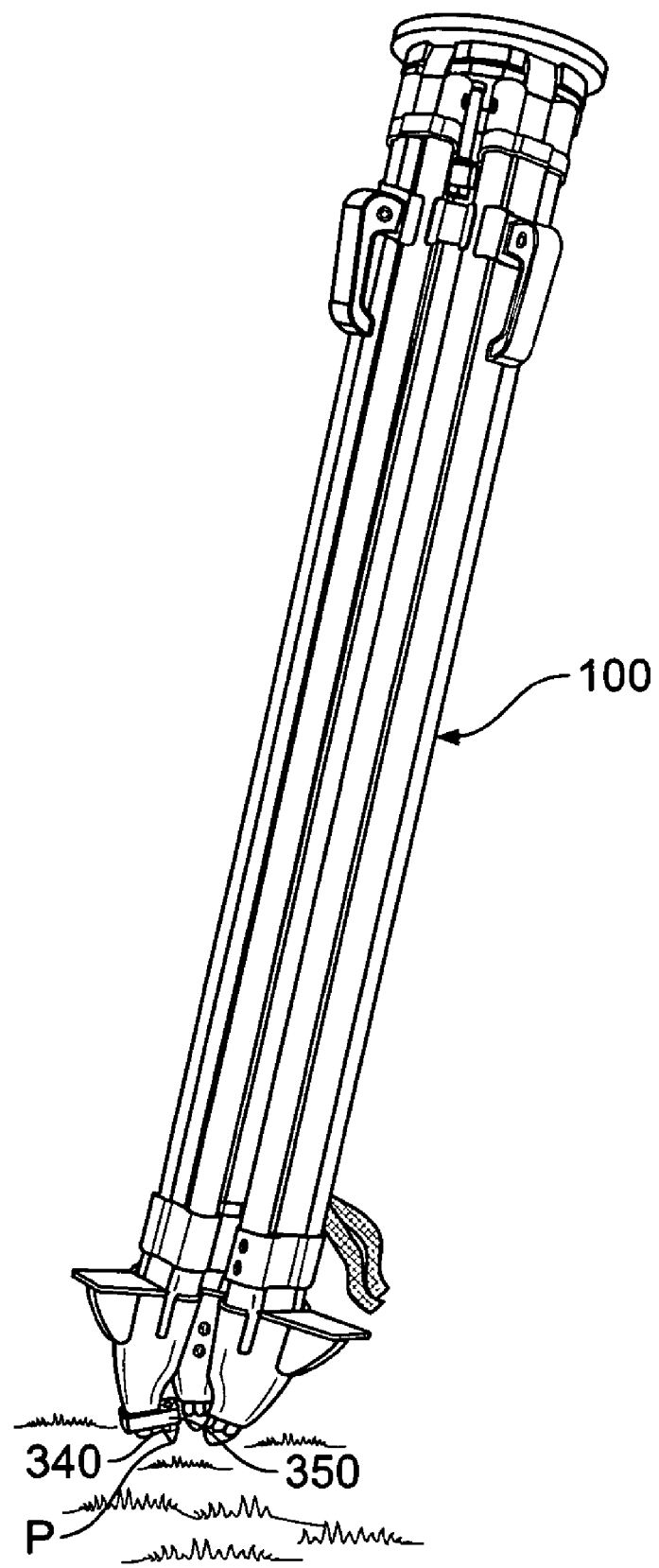
FIGS. 6 through 14 are perspective views of the multipod shown in FIG. 1, illustrating the method set forth in FIG. 5.

In accordance with the method, the user uses legs 110, 120, 130 in a sequence "0, 1, 2, 3" as labeled thereon. At step 502, the user will apply the base point 340 of leg "0" (leg 110) to the fiduciary point. This is illustrated in FIG. 6 where tripod 100 is positioned at a base point "P" (at the junction of the tiles shown in FIG. 6) so that the base point 340 engages point "P". Because leg 110 is longer by virtue of the fact that the centering block 350 extends the length of base point 340, base point 340 is the only point which will engage the fiduciary point "P". If one were to use the alternative embodiment where each leg included a centering bracket, one need only extend the length of leg 110 by some amount so that its length was greater than any of the other legs, to ensure point 340 engages the fiduciary point. It also should be recognized that any leg might be used as a centering point in the symmetric configuration described above. In alternative embodiments of the invention, where positioning of the tripod on a fiduciary point is not critical, step 502 may be skipped.

Figure 7:
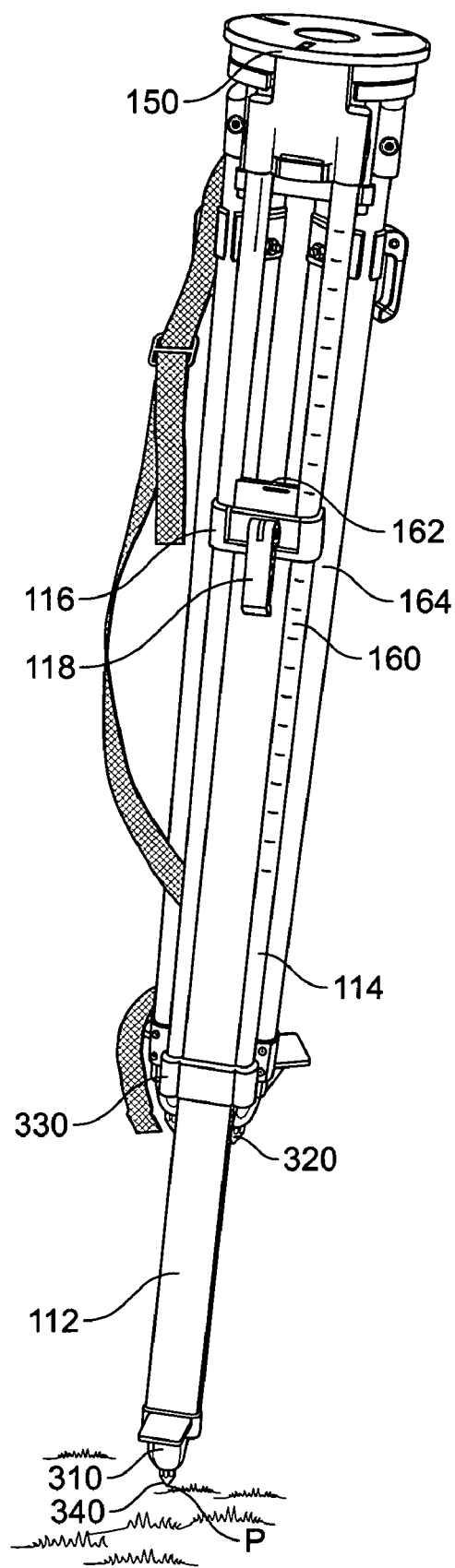
Figure 8:
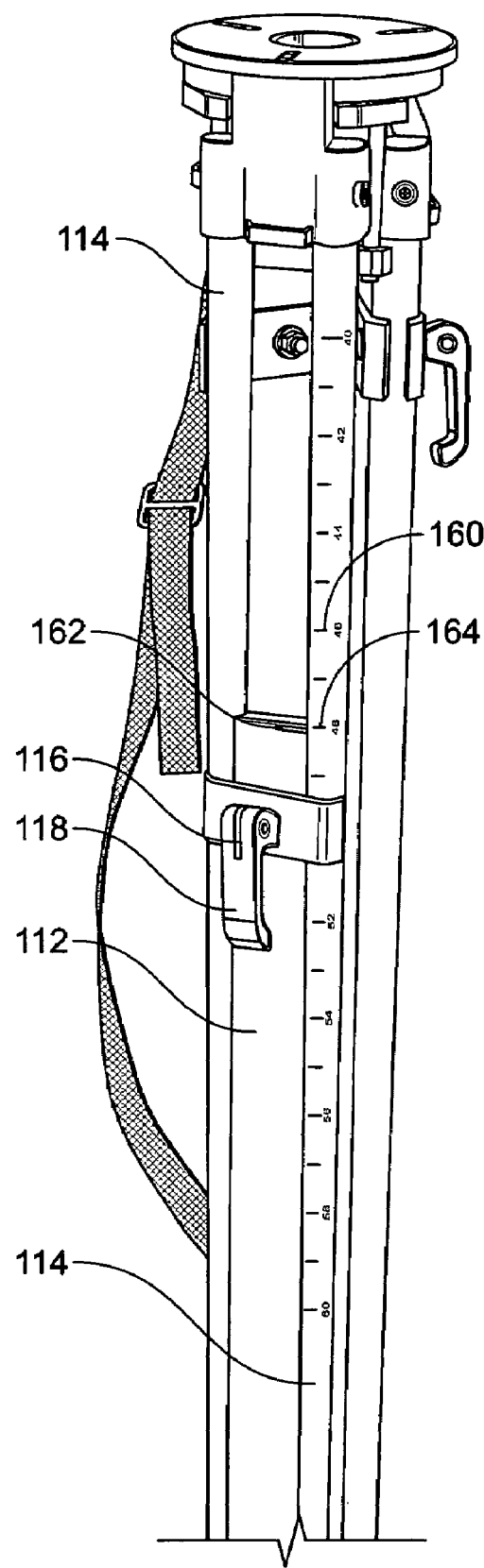

Next, at step 504, a user will establish the specified certain height desired for the platform by extending leg 110 to reach the desired height as measured by the demarcations on the side of the leg. It should be recognized that the height selection step is optional where height of the tripod is not critical. This is illustrated in FIG. 7. In FIG. 7 it can be seen that inner member 112 has extended out beyond outer member 114 and demarcation line 162 is now aligned with one of the markings 164 specifying a certain height for tripod 110. Bracket 116 and clamp 118 have locked leg 110 in this height position; therefore, assuring the user that platform 150 is at the certain height denoted by scale 160. Again, as shown in FIG. 7, base point 340 remains engaged with point "P". This is further illustrated in FIG. 8 which is an enlarged version of FIG. 7. As shown therein, the user has set a height of 48 inches by matching demarcation line 162 to the 48 inch mark on outer member 114.

In an alternative embodiment, the height of the platform may be set using an external height measuring apparatus, such as a ruler, tape measure or laser measurement device. In a further embodiment, the laser measurement device may be affixed to the platform 150.

It should be recognized that steps 502 and 504 may be reversed. That is, the height of platform 150 may be established prior to positioning base point 340 on fiduciary point P.

Figure 9:
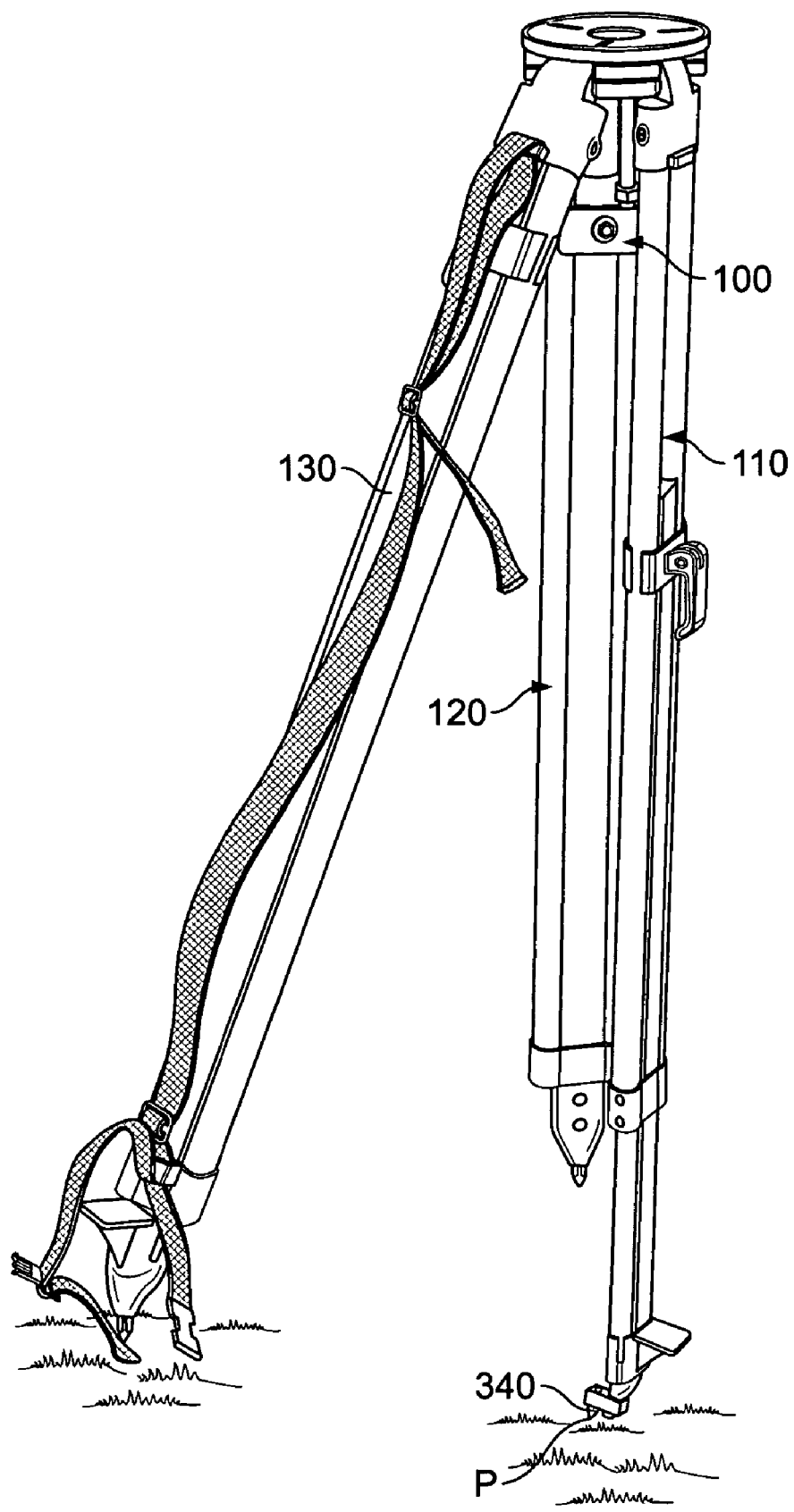

Next, at step 506, the user rotates leg "1" (leg 130) about its hinge 140' in preparation to extend the leg to secure the tripod base of leg "1" to the surface upon which the tripod rests. This is illustrated in FIG. 9. Again, it should be noticed that point "P" and base point 340 remain in engagement.

Figure 10:
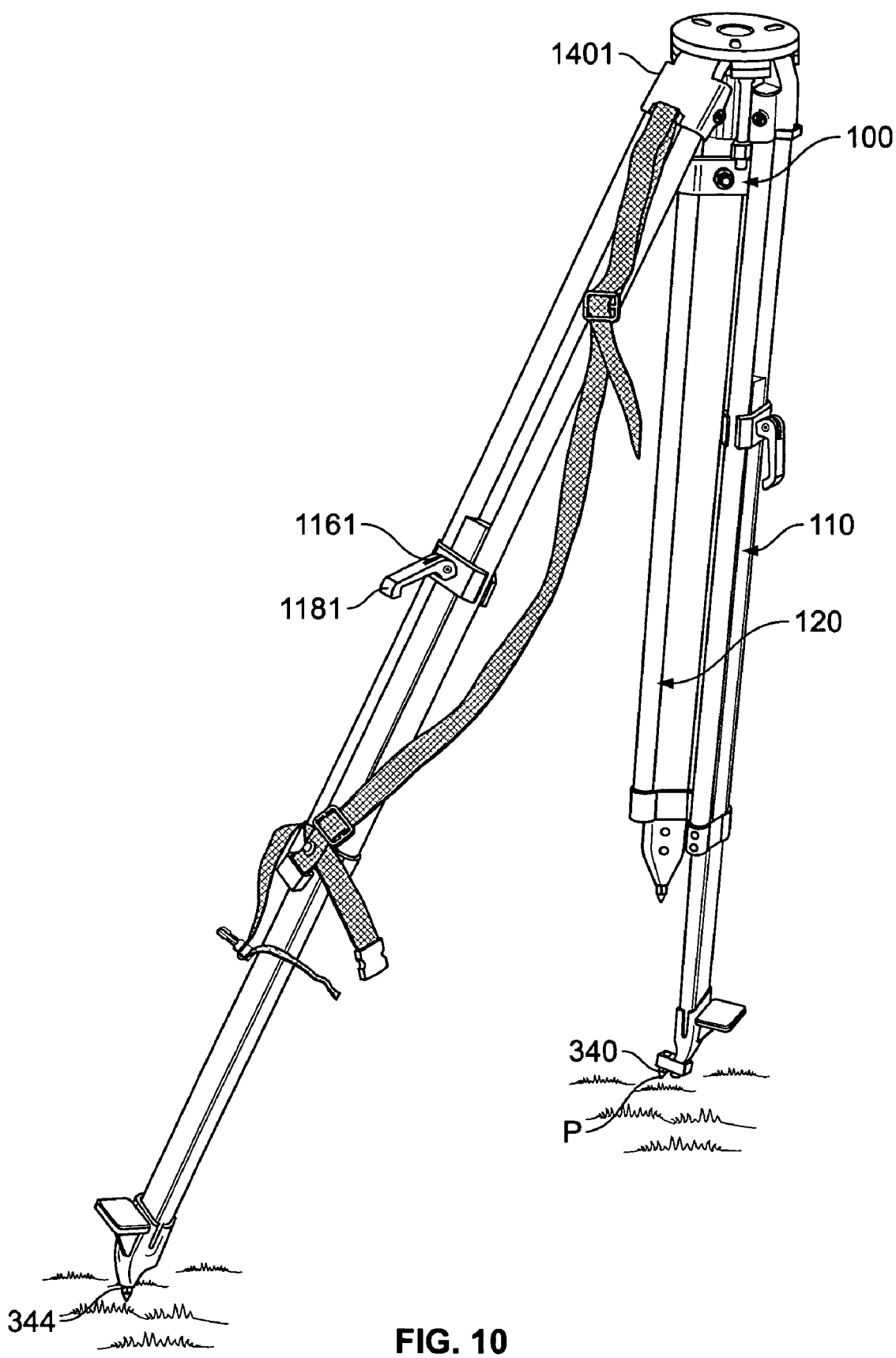
Figure 11:
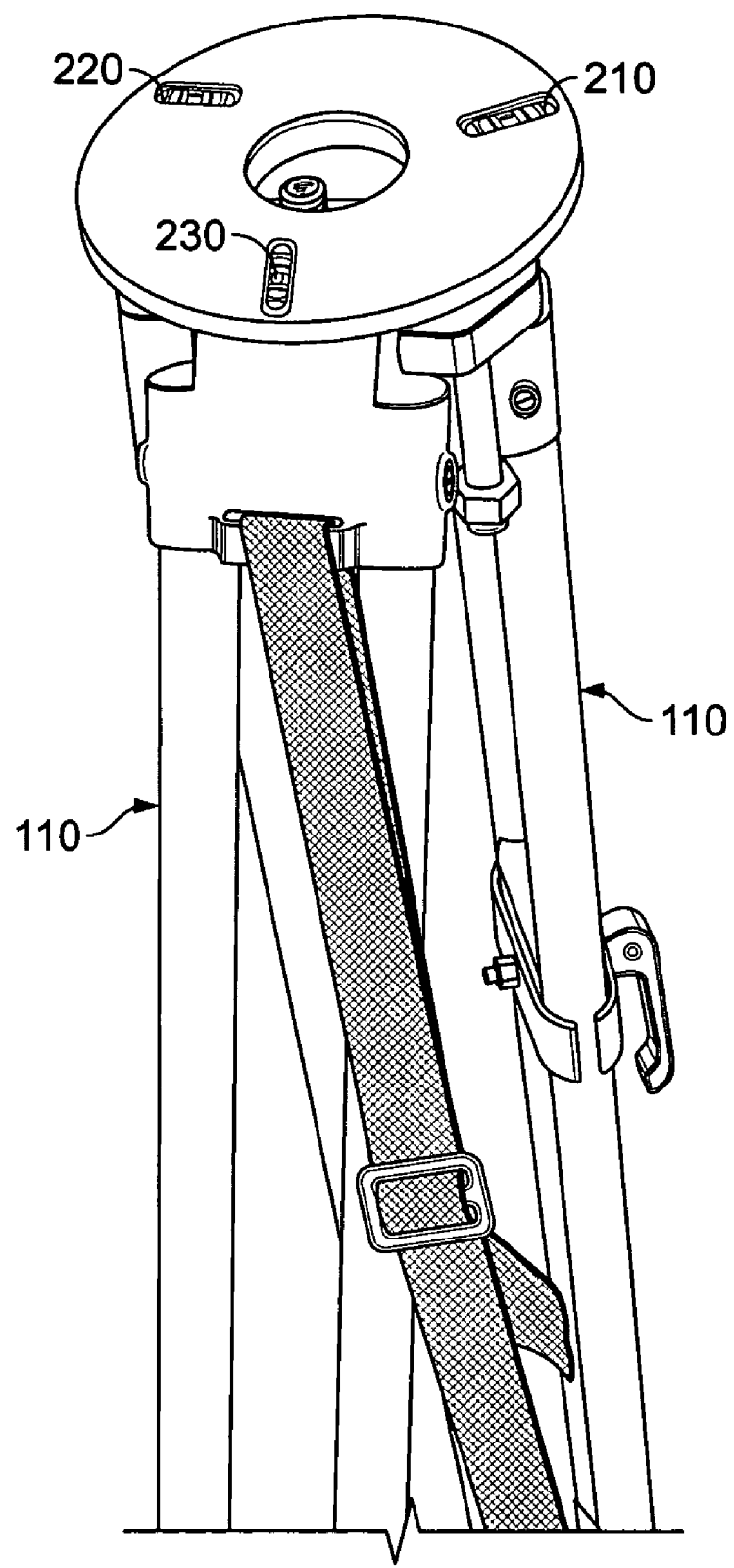

Next, at step 508 and as illustrated in FIG. 10, leg "1" is extended so that its base point 344 is now engaged with the surface upon which the tripod rests. Again, the leg is secured by the locking bracket 116' and 118; shown in FIG. 10. Once extended, the user can use vial 210 (which, is noted in FIG. 2A, is labeled "1" and associated with leg "1") to ensure that the platform 150 is level along the axis formed by the end point 344 of leg "1" and point "P" (This axis will be equivalent to axis 1-C" when the tripod is fully positioned). FIG. 11 illustrates a user leveling the device along axis 1-C" using bubble vial 220. Once the bubble is centered in vial 210, the user can be assured that once the leg is locked using clamp 118, so that platform is level along axis 1-C". It will also be noted that rotation of the vial about the line formed between base point 344 (on leg 130) and point 340 (on leg 110) will not change the position of the bubble in vial 230 once centered unless the tripod is on a very uneven surface. Even where the surface is very uneven, the degree of movement of the bubble in vial 230 will be extremely small relative to the amount of rotation about the axis.

Figure 12:
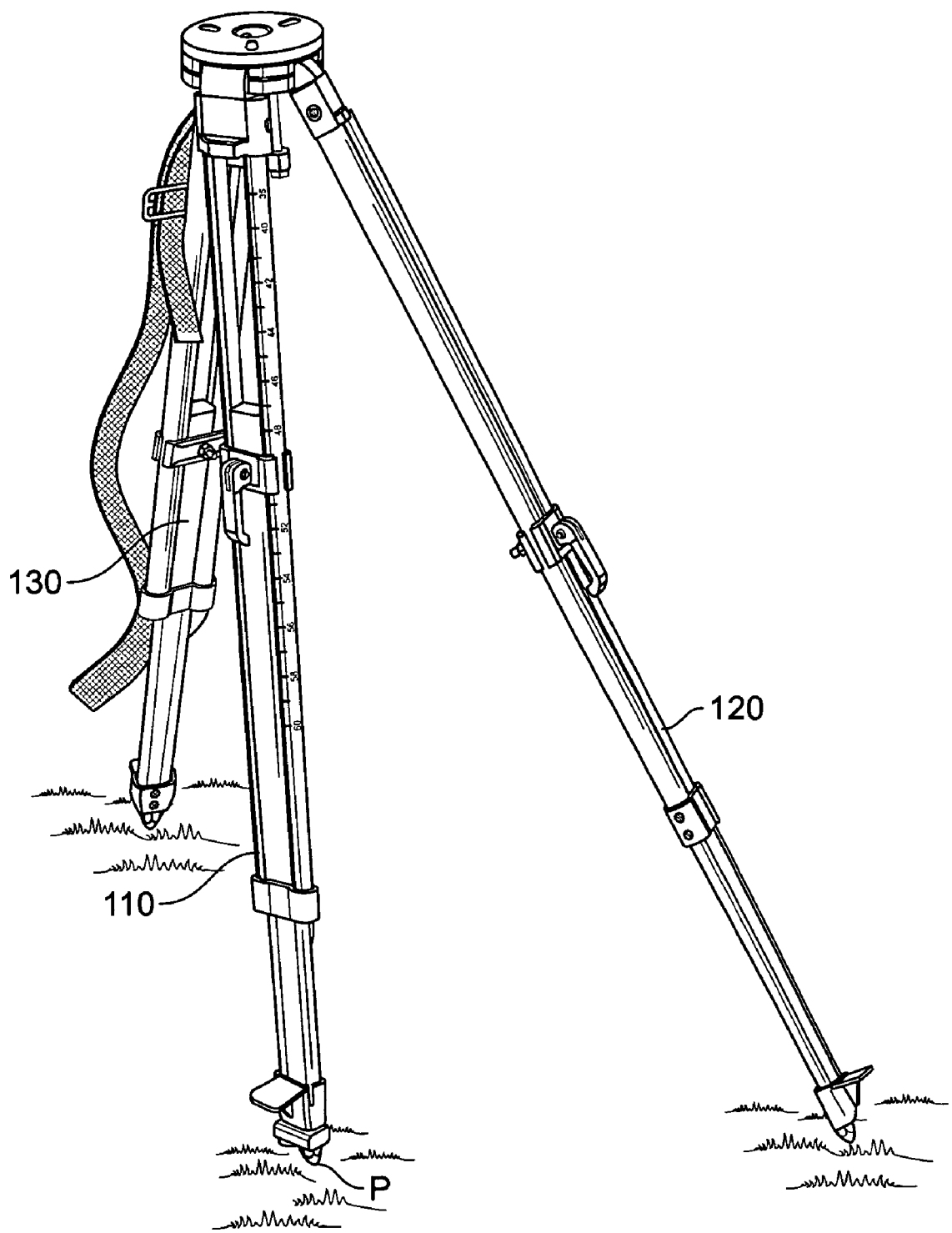
Figure 13:
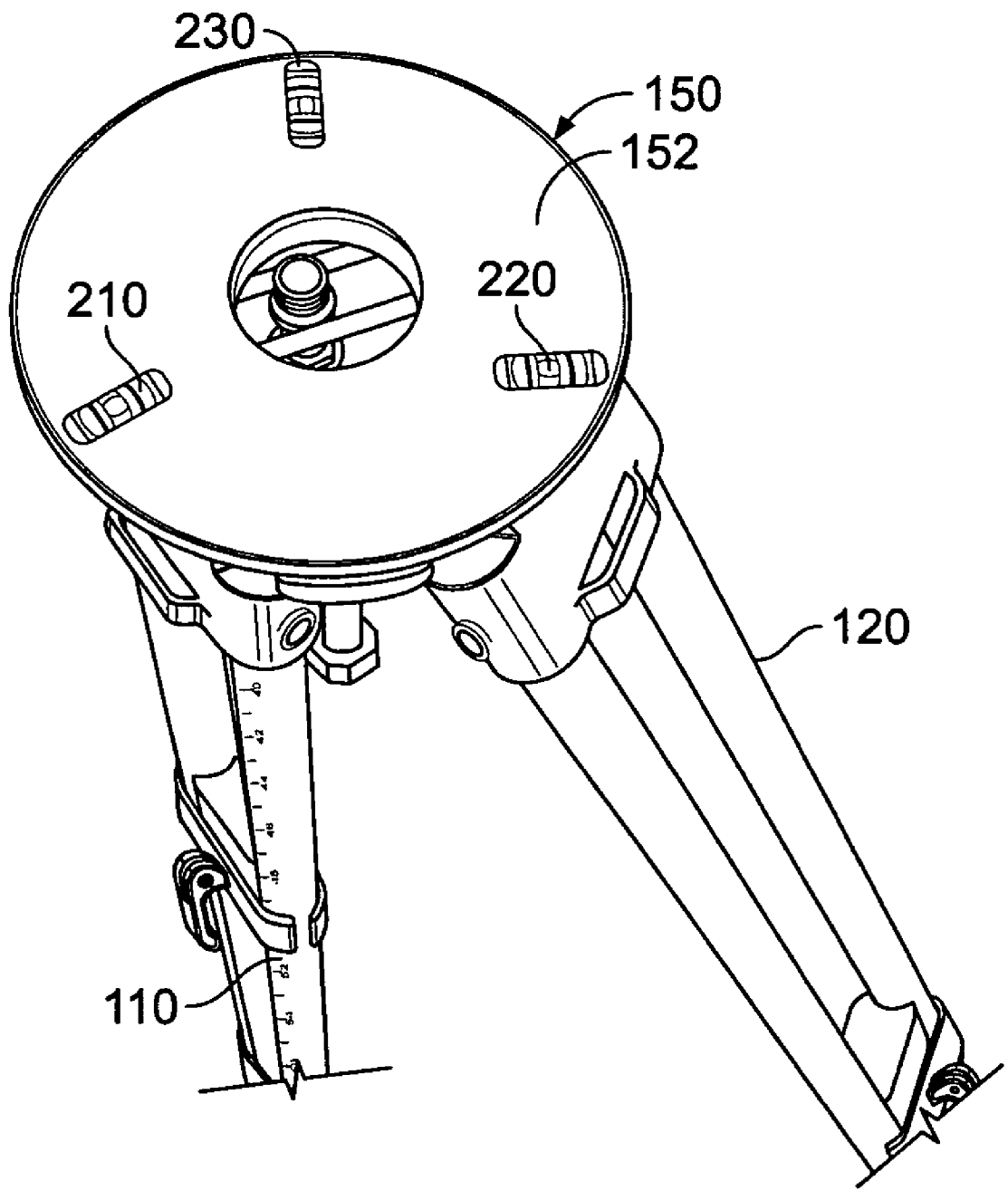

Next, at step 510, leg "2" is extended to this surface for support and the platform as leveled along a second axis using vial 220 in a manner similar to that described above with respect to leg "0" (leg 110). This is illustrated in FIG. 12.

As illustrated in FIG. 2B, since bubble vial 220 is perpendicular to vial 210, positioning of platform 150 is level in two dimensions once bubbles are centered in vials 220 and 210. This perpendicular position ensures full efficiency between the two dimensions measured. Once leg (120) "2" is secured as illustrated in FIG. 12, the user has completely leveled the platform 150. However, leg 110 is still perpendicular to the surface of platform 150 as shown in perspective view in FIG. 13. Therefore to increase the stability of the platform, leg 110 should be repositioned.

At step 512, in order to rotate leg "0,3" about hinge 140, the user may alternatively shorten leg 110 by unlocking claim 116 and rotating the leg outward, or may rock the tripod about an axis formed between base points 342, 344 engaging the surface upon which the tripod rests to lift point 340 off of point "P" allowing leg 110 to be rotated outward. At step 514, leg "0,3" is extended to the surface to support the tripod, and the platform leveled using a third bubble vial 210. Once all three bubble vials are level, the user can be assured that base platform 150 is level. This completed, leveled tripod is shown in FIG. 14.

While leg 110 is extended, and now has a length longer than that indicated on the scale 160, since legs 120 and 130 are fixed, the height of the platform 150 when leveled will remain at the height established in step 504.

Hence, the tripod is installed at a specific height and centered over a fiduciary point according to a method which is much more efficient than prior methods requiring trial and error. The method requires a minimal number of leg movements to accurately position the platform 150. Once leg "1" is extended to the surface and the platform 150 leveled using bubble vial 230, any sway about the base points 344 and 340 (to the left or right in FIG. 2B) will not result in any substantial change of the centering of vial 210. Likewise, once vial 220 for leg "2" is leveled and leg 110 moved into position, the centering of the bubble in vial 230 ensured that vials 210 and 220 will return to center. Hence, the platform 150 will be completely level at the fixed the user has now established a level platform for using instruments in a much more efficient manner than known in the prior art.

It should be noted that the tripod of the present invention has a number of unique aspects. In particular, the offset center-point of base point 340 on one of the legs allows the user to accurately center the device about the fiduciary point "P" on the ground. It should also be recognized that alternatives to bubble vials may be used in platform 150, such as bulls-eye levels.

In yet another alternative embodiment, a fourth, monopod leg might be included in the multi-pod device of the present invention. In this embodiment, a fourth leg extends downward from the center of tripod base 150, with the fourth leg including a measurement scale such as scale 160 shown in FIG. 1 on leg 110. In this embodiment, the user would extend the center leg to the surface, keeping a base point of the fourth leg in contact with the fiduciary point "P". The user can then extend each of the legs and level the base platform 150 in the manner described with respect to steps 506 to 514.

In a still further embodiment, the invention may include a monopod having a platform with leveling heads such as those shown in FIGS. 2a and 2b. The height adjustment markings may be placed on the monopod leg. In this single leg embodiment, the stability of the platform may be assured by external supports, such as a wall or other external structure, or the user's body. In a still further embodiment, one or more legs may be added to the platform to stabilize the platform.

In a still further embodiment, more than three vials and more than three legs are utilized. For example, a quadra-pod includes a platform with four levels and four legs. Alternatively, the quadra-pod may include two, three or more vials on platform 150.

In yet another embodiment, the tripod embodiment 100 of the present invention includes a platform with only two bubble vials, such as vials 230 and 210.

In a still further embodiment, the platform 150 may be positioned on an height adjustable arm mounted on a housing securing legs 110, 120, 130 to allow further height adjustment of the platform relative to the legs. In such embodiment, the adjustable arm may further include height markings which, in conjunction with those on leg 100 (or any of legs 110, 120 and/or 130) may be used to ensure a certain height for the tripod.

FIGS. 15 and 16 show an alternative foot assembly 310A on leg 110. As shown in FIG. 15, assembly 310a includes a molded foot housing 312a which has a number of unique features. Assemblies 320a and 330a have similar, though shorter molded structures. Housing 312a includes an arcuate section 516 which provides the offset for base point 340 provided by centering block 350 in previous embodiments. The housing 312a also includes a coupling structure 510 including a leg-coupling platform 515 supported by an arch 518. The platform 515 includes two leg-holding perforations 512, 514 which allow legs 112 and 114 to be secured therein during transport of the tripod. A view of legs 120 and 130 secured in platform 515 is shown in FIG. 16. As shown therein, the base points 342 and 344 are stored in the perforations. To insert the base points 342 and 344 in the perforations, leg 110 is extended, legs 120 and 130 brought to the center of the tripod, and leg 120 retracted. A foot pad 525, allowing the user to push the leg into the ground, is also provided.

Figure 17:
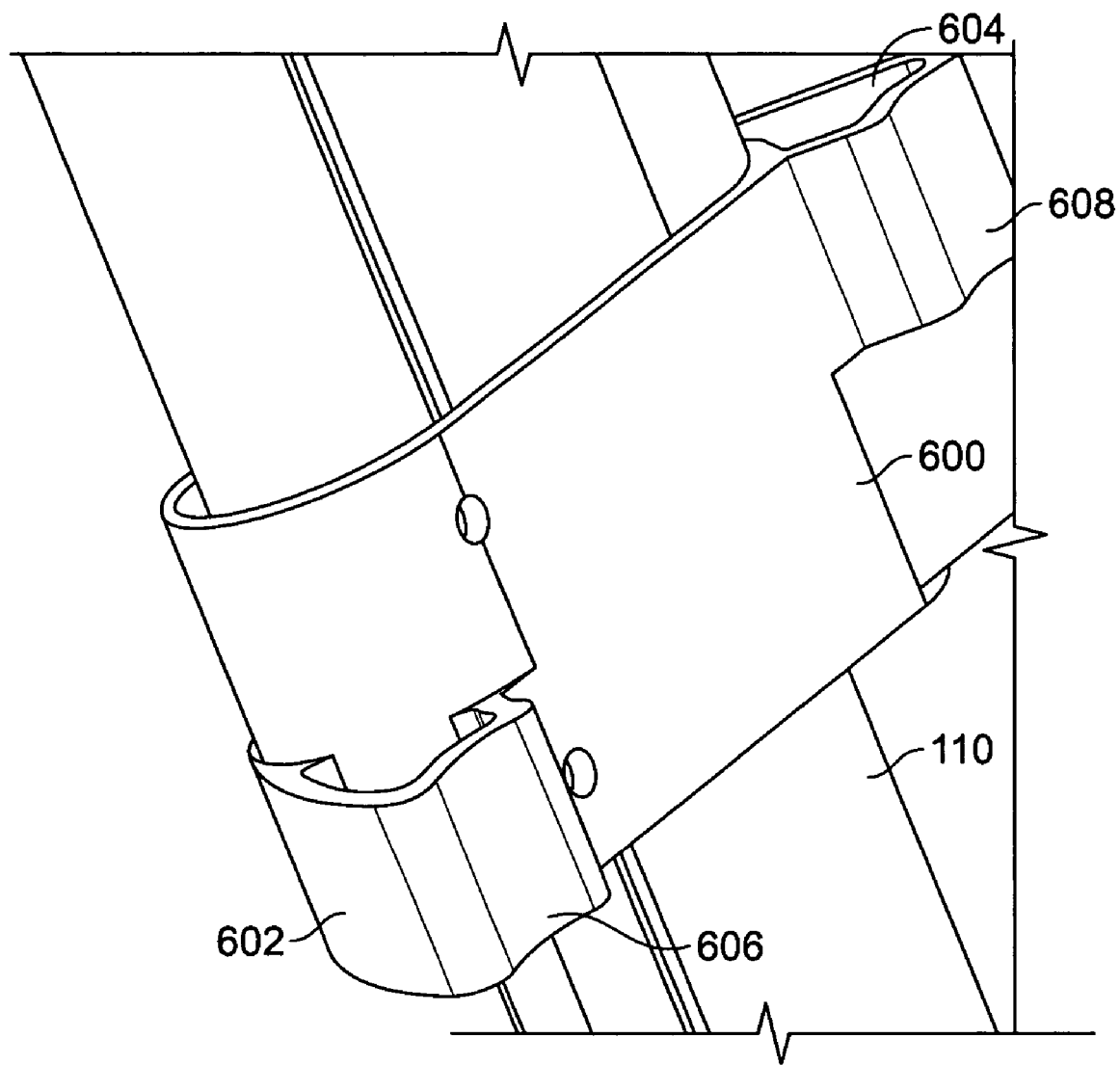
FIG. 17 is a perspective view of a leg guide provided on a leg of the multi-pod formed in accordance with the present invention.
Figure 18:
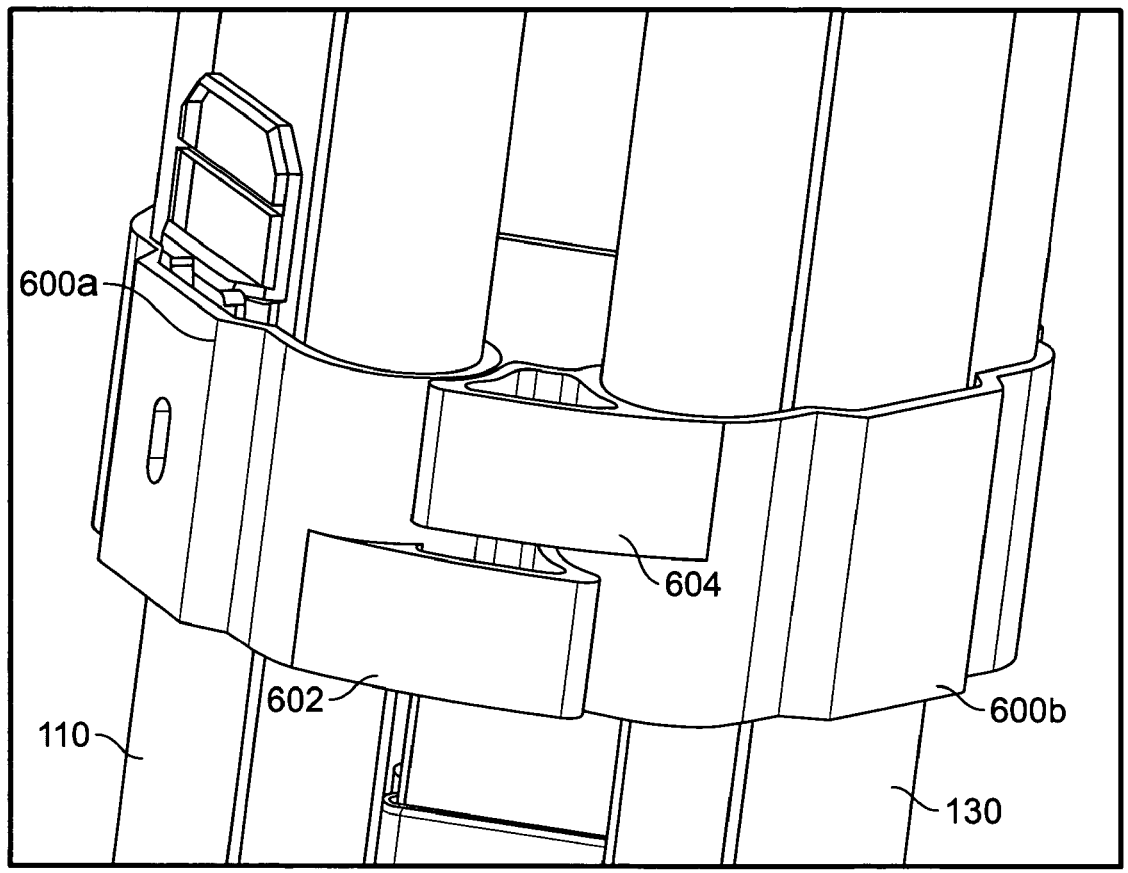
FIG. 18 is an alternative perspective view of the leg guide.

FIGS. 17 and 18 show another unique feature of the present invention wherein a leg guide 600 is attached to each leg. FIG. 17 shows guide 600 attached to leg 110. Guide 600 may be formed of plastic or other durable material. One guide is provided on each leg. Each guide may be formed to have interlocking leg stops 602 and 604. In one embodiment, each stop includes a semi-cylindrical face 606, 608, respectively, engaging a respective adjacent leg. Other embodiments and stops are possible. The interdigitation is illustrated in FIG. 18, which shows adjacent structures 600a and 600b engaging each other at the cylindrical faces. The structures prevent the legs from moving more than 90 degrees with respect to platform 150.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A method of positioning a multi-pod apparatus, comprising:
   (a) extending a first leg of said multi-pod;
   (b) positioning and extending a second leg of said multi-pod;
   (c) leveling a mounting platform on a first axis using a first level indicator on the platform;
   (d) positioning and extending a third leg of said multi-pod;
   (e) leveling the mounting platform on a second axis using a second level indicator on the platform;
   (f) rocking said tripod on said second and third legs to lift said first leg, and
   (g) re-positioning said first leg of said multi-pod; and
   (h) simultaneously leveling the mounting platform on a third axis.

2. The method of claim 1 further including the step, prior to said step (a) of positioning an end point of said first leg of said multi-pod on a fiduciary point.

3. The method of claim 1 further including the step, prior to said step (a) of setting a height of mounting platform.

4. The method of claim 3 wherein said step of setting comprises extending one of said legs to a desired height measured by a scale on said one of said legs.

5. The method of claim 1 further including the steps, prior to said step (a), of:
   positioning an end point of a first leg of said multi-pod on a fiduciary point;
   setting a height of a mounting platform.

6. The method of claim 1 wherein said steps of positioning comprise:
   lengthening said leg and rotating said leg about an axis away from a centerline extending through a mounting region on the platform.

7. An apparatus, comprising:
   a mounting platform including a three axis leveling apparatus;
   a first leg including a first end rotatably coupled to the mounting platform and a second end having a centering base point provided thereon;
   a second leg and a third leg, each having a first end rotatably coupled to the mounting platform and a second end with a base point;
   first, second and third bubble vials, said first, second and third bubble vials being positioned on said mounting platform at a position over said respective first, second and third legs;
      wherein said first bubble vial is oriented at 90 degrees with respect to said second bubble vial;
      wherein said first and third bubble vials are oriented along a line of rotation formed by rotation of said first and third leg relative to the mounting platform;
      wherein said first leg includes a leg coupling attachment securing said base points of said second and third legs to said first leg.

8. The apparatus of claim 7 wherein said first leg includes a height scale.

9. The apparatus of claim 7 further including a leg guide positioned on at least one of said legs, intersecting two adjacent legs.

10. The apparatus of claim 9 wherein each leg includes a leg guide positioned between the first end and the second end thereof, each guide securing said legs in a perpendicular relationship with respect to the mounting platform when each said guide abuts adjacent legs.

* * * * *